United States Patent
Line et al.

(10) Patent No.: US 8,905,431 B1
(45) Date of Patent: Dec. 9, 2014

(54) SIDE AIRBAG ASSEMBLY FOR A VEHICLE SEAT

(71) Applicant: Ford Global Technologies, LLC, Dearborn, MI (US)

(72) Inventors: Johnathan Andrew Line, Northville, MI (US); Marcos S. Kondrad, Macomb Township, MI (US); Benjamin Yilma, Canton, MI (US); Lisa Koth, Dearborn, MI (US); Beatriz Esthela Padilla, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/035,395

(22) Filed: Sep. 24, 2013

(51) Int. Cl.
*B60R 21/16* (2006.01)
*B60R 21/2165* (2011.01)

(52) U.S. Cl.
CPC .................................. *B60R 21/2165* (2013.01)
USPC ................... 280/730.2; 280/728.2; 280/728.3

(58) Field of Classification Search
USPC ................................ 280/728.2, 728.3, 730.2
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyana et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,458,365 A | 10/1995 | Rogers et al. |

(Continued)

FOREIGN PATENT DOCUMENTS

| | | |
|---|---|---|
| EP | 0754590 | 1/1997 |
| EP | 1123834 | 8/2001 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Toan To
(74) *Attorney, Agent, or Firm* — Vichit Chea; Price Heneveld LLP

(57) ABSTRACT

A vehicle seat includes a seatback having a support structure with a rigid frame member that extends within a side of the support structure. A side airbag assembly includes an airbag coupled with the frame member. First and second trim pieces engaged along a seam to conceal the airbag. A flange protrudes along an edge of the first trim piece and a cavity extends along the second trim piece to matably engage the flange. A retention slot is disposed on a wall of the cavity and an attachment element protrudes adjacent to the flange to frictionally engaging the retention slot. The attachment element is configured to disengage from the retention slot upon deployment of the airbag forward through the seam.

20 Claims, 9 Drawing Sheets

(56) References Cited

U.S. PATENT DOCUMENTS

| | | |
|---|---|---|
| 5,518,294 A | 5/1996 | Ligon, Sr. et al. |
| 5,547,214 A | 8/1996 | Zimmerman, II et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,612,610 B1 * | 9/2003 | Aoki et al. ............. 280/730.2 |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanese et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,290,791 B2 * | 11/2007 | Tracht ............. 280/730.2 |
| 7,344,189 B2 | 3/2008 | Reed et al. |
| 7,347,444 B2 | 3/2008 | Wheelwright |
| 7,350,859 B2 | 4/2008 | Klukowski |
| 7,393,005 B2 * | 7/2008 | Inazu et al. ............. 280/730.2 |
| 7,425,034 B2 | 9/2008 | Bajic et al. |
| 7,441,797 B2 * | 10/2008 | Tracht et al. ............. 280/730.2 |
| 7,441,838 B2 | 10/2008 | Patwardhan |
| 7,467,823 B2 | 12/2008 | Hartwich |
| 7,478,869 B2 | 1/2009 | Lazanja et al. |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,753,451 B2 | 7/2010 | Maebert et al. |
| 7,775,602 B2 | 8/2010 | Lazanja et al. |
| 7,784,819 B2 * | 8/2010 | Lawall et al. ............. 280/728.3 |
| 7,784,863 B2 | 8/2010 | Fallen |
| 7,793,973 B2 * | 9/2010 | Sato et al. ............. 280/730.2 |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 2001/0011812 A1 * | 8/2001 | Seki et al. ............. 280/730.2 |
| 2004/0195870 A1 | 10/2004 | Bohlender et al. |
| 2005/0200166 A1 | 9/2005 | Noh |
| 2005/0258624 A1 * | 11/2005 | Abraham et al. ............. 280/728.3 |
| 2006/0043777 A1 | 3/2006 | Friedman et al. |
| 2006/0113762 A1 * | 6/2006 | Tracht et al. ............. 280/730.2 |
| 2007/0120401 A1 | 5/2007 | Minuth et al. |
| 2007/0170707 A1 * | 7/2007 | Sato et al. ............. 280/730.2 |
| 2008/0174159 A1 | 7/2008 | Kojima et al. |
| 2009/0066122 A1 | 3/2009 | Minuth et al. |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Proctor et al. |
| 2011/0278886 A1 | 11/2011 | Nitsuma |

(56) References Cited

U.S. PATENT DOCUMENTS

| | | |
|---|---|---|
| 2011/0298261 A1 | 12/2011 | Holt et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatse et al. |
| 2012/0248833 A1 | 10/2012 | Hontz et al. |
| 2012/0261974 A1 | 10/2012 | Yoshizawa et al. |

FOREIGN PATENT DOCUMENTS

| | | |
|---|---|---|
| EP | 0926969 | 1/2002 |
| EP | 1266794 | 12/2002 |
| EP | 1329356 | 7/2003 |
| EP | 1084901 | 6/2006 |
| EP | 1674333 | 6/2006 |
| EP | 1950085 | 7/2008 |
| EP | 1050429 | 11/2009 |
| WO | 9511818 | 5/1995 |
| WO | 9534449 | 12/1995 |
| WO | 9958022 | 11/1999 |
| WO | 2006131189 | 12/2006 |
| WO | 2007028015 | 8/2007 |
| WO | 2008073285 | 6/2008 |
| WO | 2011021952 | 2/2011 |
| WO | 2012008904 | 1/2012 |
| WO | 2013070905 | 5/2013 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.Com, "Cineak Motorized Articulating Headrest Preview," http://www.ecoustics.com/ah/reviews/furniture/accessories/cineak-motorized-headrest, Jan. 10, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

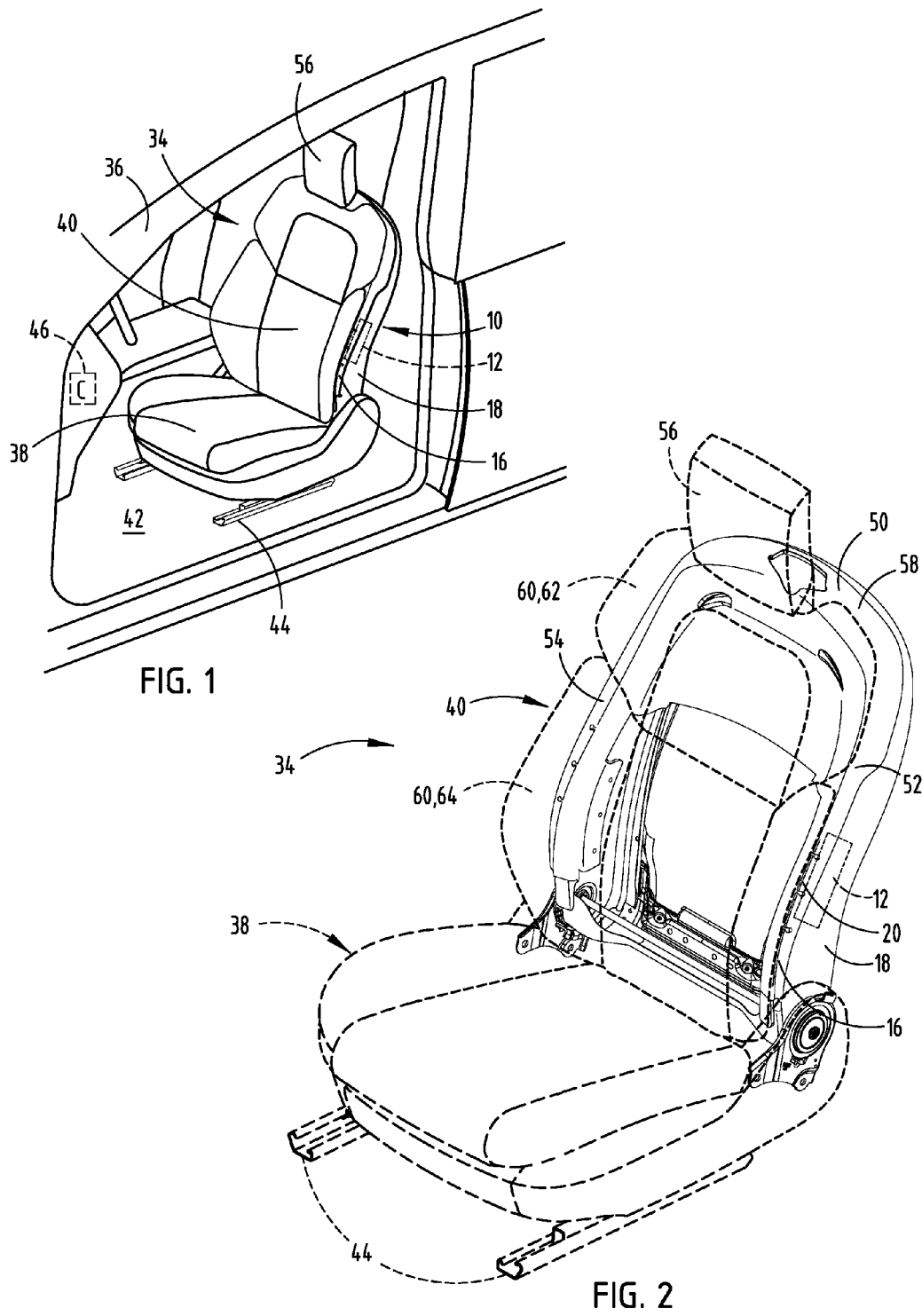

SIDE AIRBAG ASSEMBLY FOR A VEHICLE SEAT

CROSS-REFERENCE TO RELATED APPLICATION

This application is related to U.S. patent application Ser. No. 13/749,589, now U.S. Pat. No. 8,727,374, entitled "VEHICLE SEAT WITH SIDE AIRBAG DEPLOYMENT," filed on Jan. 24, 2013, the entire disclosure of which is hereby incorporated herein by reference.

FIELD OF THE INVENTION

The present invention generally relates to an airbag assembly, and more particularly relates to a side airbag assembly that is attached to and deploys from a vehicle seat.

BACKGROUND OF THE INVENTION

It is becoming increasingly more common for vehicles to include airbag assemblies in locations that allow the contained airbag to deploy to desired areas of protection quickly and with a high degree of precision. It is generally understood that one location airbag assemblies are more frequently incorporated is within a seatback for deploying between a passenger and an adjacent vehicle door. Typically, these side airbags are encased within the fabric upholstery material of the seatback, such that upon deployment of the airbag the upholstery material is torn. This form of deployment may result in inconsistent airbag deployment and substantial damage to the seatback. As vehicle seats are equipped with airbag assemblies, it is also becoming desirable to decrease the overall volume of vehicle seats for reducing weight and providing adequate space for the passengers within the vehicle.

SUMMARY OF THE INVENTION

According to one aspect of the present invention, a side airbag assembly includes an airbag coupled with a vehicle seat frame. First and second trim pieces are engaged along a seam to conceal the airbag. A flange protrudes along an edge of the first trim piece and a cavity extends along the second trim piece to matably engage the flange. A retention slot is disposed on a wall of the cavity and an attachment element protrudes adjacent to the flange to frictionally engage the retention slot. The attachment element is configured to disengage from the retention slot upon deployment of the airbag forward through the seam.

According to another aspect of the present invention, a side airbag assembly includes an airbag coupled with a seat frame. A first trim piece and a second trim piece engage along a seam over the airbag. A flange is along an edge of the first trim piece and a cavity is along the second trim piece to engage the flange. A slot is on a wall of the cavity and an attachment element is on the flange that engages the slot for disengaging upon deployment of the airbag through the seam.

According to yet another aspect of the present invention, a side airbag assembly for a vehicle seat includes an airbag. A front trim member has a flange extending laterally and a rear trim member has a cavity along an edge thereof. A slot is disposed on a wall of the cavity. An attachment element protrudes from the flange and engages the retention slot for disengaging upon a deployment of the airbag. The flange engages the cavity to define a breakaway seam for the deployment of the airbag.

According to another aspect of the present invention, a side airbag assembly includes an airbag coupled with a vehicle seat frame. First and second trim pieces engaged along a seam to conceal the airbag and to provide a highly crafted design appearance. A flange protrudes along an edge of the first trim piece and a cavity extends along the second trim piece to matably engaging the flange. A retention slot is disposed on an exterior wall of the cavity and an attachment element protrudes adjacent to the flange to frictionally engage the retention slot. The attachment element is configured to disengage from the retention slot upon deployment of the airbag forward through the seam with little impediment to the airbag to meet timing needs.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a seating assembly within a vehicle;

FIG. 2 is a top perspective view of the seating assembly showing a support structure of a seatback and passenger support and a head restraint shown in dashed lines;

DETAILED DESCRIPTION OF THE PREFERRED EMBODIMENTS

Figure 3:
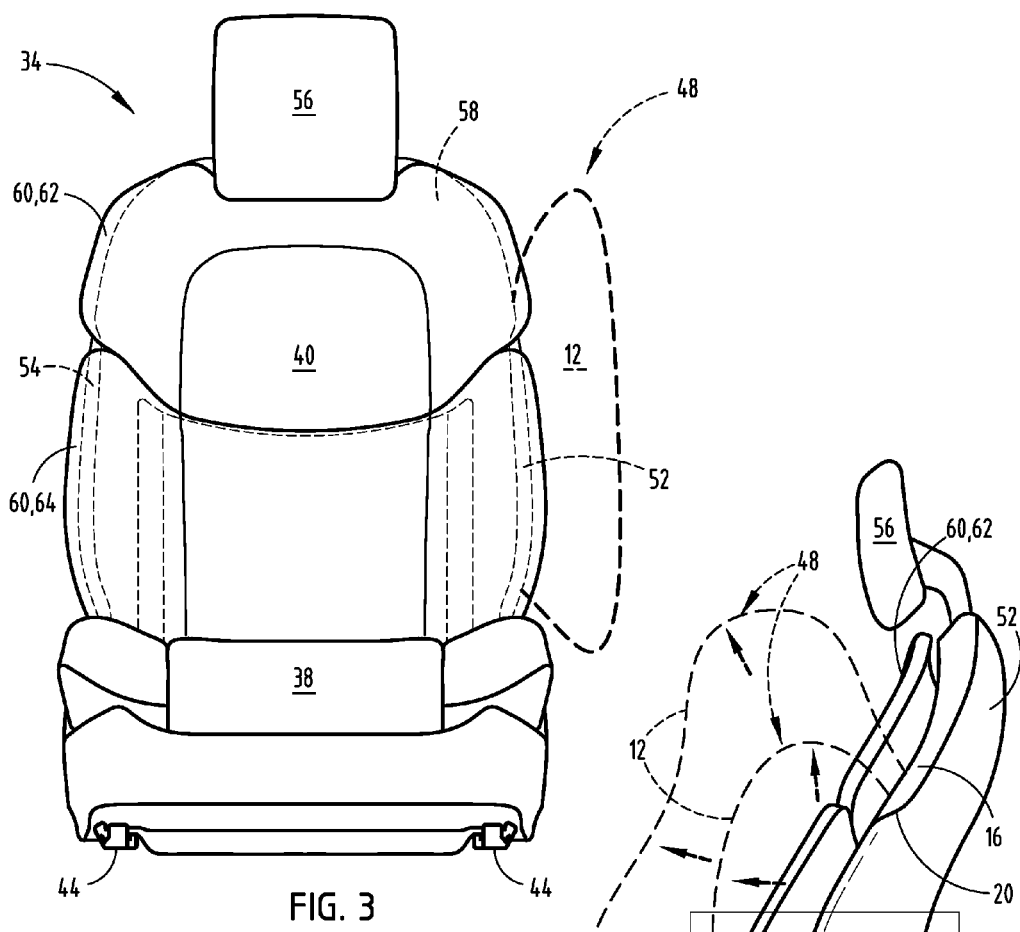
FIG. 3 is a front elevational view of the seating assembly, showing an airbag assembly deployed in dashed lines.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12A, reference numeral 10 generally designates a side airbag assembly that includes an airbag 12 coupled with a seat frame 14. A first trim piece 16 and a second trim piece 18 are engaged along a seam 20 to conceal the airbag 12. A flange 22 protrudes along an edge 24 of the first trim piece 16 and a cavity 26 extends along the second trim piece 18 to matably engage the flange 22. A retention slot 28 is disposed on an exterior wall 30 of the cavity 26 and an attachment element 32 protrudes adjacent to the flange 22 to frictionally engaging the retention slot 28. The attachment element 32 is configured to disengage from the retention slot 28 upon deployment of the airbag 12 forward through the seam 20.

Referring now to FIG. 1, a seat assembly 34 is positioned in a driver side location of a vehicle 36. The seat assembly 34 includes a seat bottom 38 that is pivotally coupled with a seatback 40 for pivotally adjusting the seatback 40 between upright and reclined positions relative to the seat bottom 38. The seat bottom 38 is slidably coupled with a floor 42 of the vehicle 36 upon a track assembly 44. The track assembly 44 is configured to allow the seat assembly 34 to adjust in a forward and rearward direction relative to the floor 42 of the vehicle 36. It is understood that the seat assembly 34 may be positioned in various positions throughout the vehicle 36 other than the illustrated location, such as a passenger side location, a mid-row location, and a rear seat location. It is also conceivable that the seat assembly 34 may not include the reclining feature and may not include the track assembly 44, such that the seat assembly 34 may be fixedly or alternatively coupled with the floor 42 of the vehicle 36.

As also shown in FIG. 1, a controller 46 on the vehicle 36 is electrically coupled with the side airbag assembly 10. The controller 46 operates to actuate the airbag 12 within the side airbag assembly 10, causing the airbag 12 to inflate to a deployed position 48 (FIG. 3) when the controller 46 senses a collision event of the vehicle 36, as generally understood in the art. The side airbag assembly 10 is included on and deploys from the outboard side of a support structure 50 of the seatback. The outboard connotation, for purposes of this disclosure, refers to a lateral side most proximate a side door or a side interior region of the vehicle 36. In turn, the inboard connotation for purposes of this disclosure refers to an area most proximate in a central interior region of the vehicle 36 between the laterally opposing outboard sides.

With reference to FIG. 2, the seatback 40 includes the support structure 50, which has a first side member 52 and a second side member 54, each pivotally coupled with a rear portion of the seat bottom 38. A head restraint 56 is coupled with and supported by a top member 58 of the support structure 50 and is positioned centrally between the first and second side members 52, 54. A passenger support 60 extends forward from the support structure 50 and includes an upper support component 62 and a lower support component 64 for supporting an occupant's upper and lower back, respectively. The upper support component 62 is configured to pivot forward relative to the support structure 50 and the lower support component 64 statically couples with the support structure 50. Although, it is conceivable that the upper support component 62 may also be static relative to the support structure 50.

It is also contemplated that the upper and lower support components 62, 64 of the passenger support 60 may be a single integral component that extends forward from the support structure 50. Further, it is conceivable that the head restraint 56 may be integrated with the upper support component 62 or that the head restraint 56 may otherwise not be included on the seat assembly 34.

Figure 4:
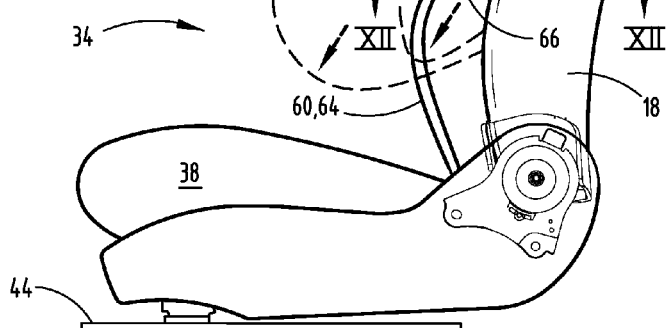
FIG. 4 is a side elevational view of the seating assembly, showing an airbag assembly deployed in dashed lines.

The passenger support 60, as shown in the embodiment illustrated in FIGS. 3-4, extends forward and is suspended away from the support structure 50 to define an external peripheral gap 66 spanning along the first and second side members 52, 54 and the top member 58. The external peripheral gap 66 may expand upon forward pivoting of the upper support component 62 and may be compressed proximate an application of rearward force to the passenger support 60. However, the external peripheral gap 66 is configured to remain large enough for the airbag 12 of the side airbag assembly 10 to deploy forward from the outboard side member 52, through the external peripheral gap 66, and position the airbag 12 in a deployed position 48, as shown in dashed lines. The deployed position 48 of the airbag 12 in the illustrated embodiment aligns the airbag 12 accurately between an occupant seated in the seat assembly 34 and an adjacent door of the vehicle 36 (FIG. 1), as described in more detail below.

Figure 5:
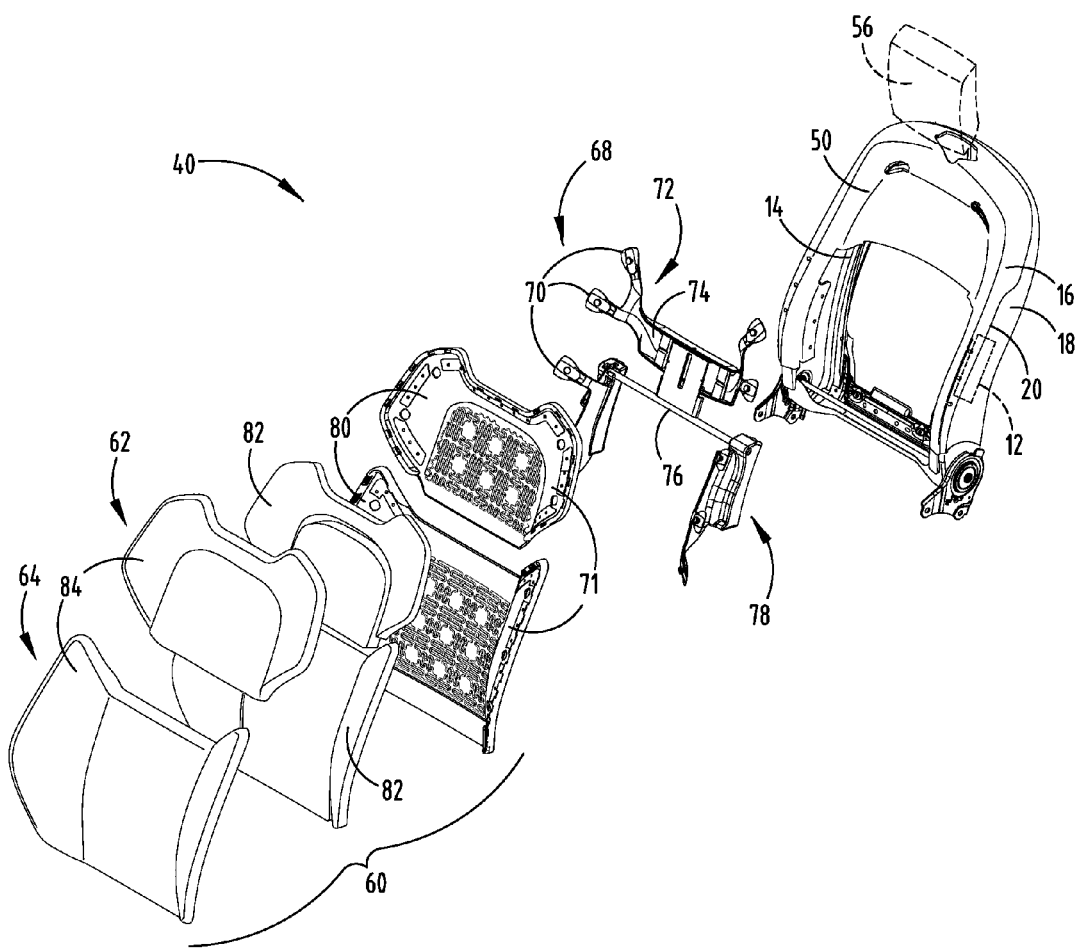
FIG. 5 is an exploded top perspective view of the seatback.

As illustrated in FIG. 5, the upper and lower support components 62, 64 of the passenger support 60 are attached to the support structure 50 with a suspension assembly 68. In the illustrated embodiment, the suspension assembly 68 includes flexible members 70 extending forward and laterally outward from the seatback support structure 50 to operably couple with angled side bolsters 71 of the passenger support 60. The angled side bolsters 71 are located on the lateral sides of the upper and lower support components 62, 64 and are integrated with the shape of the upper and lower support components 62, 64 to prevent lateral movement of an occupant's back relative to the passenger support 60. An upper section 72 of the suspension assembly 68 has a central body 74 and two outwardly extending flexible members 70 on opposing sides of the central body 74. The central body 74 of the upper section 72 operably couples with a pivot bar 76 that laterally extends between the opposing side portions of a lower section 78 of the suspension assembly 68. The opposing side portions of the lower section 78 similarly includes outwardly extending flexible members 70 that couple with the lower support component 64 of the passenger support 60. Accordingly, in the illustrated embodiment, the lower section 78 is static and the upper section 72 is configured to pivot forward about the pivot bar 76 to pivotally adjust the upper support component 62 relative to the lower support component 64. It is contemplated that the pivot bar 76 may be operably controlled with a motorized actuation assembly or a manually adjustable actuation mechanism, and also conceivable that the upper support component 62 may be statically coupled with the support structure 50 of the seatback 40. It is also conceivable that more or fewer flexible members 70 may be included on the upper and/or lower sections 72, 78, such as a single fin-shaped flexible member 70 on either side of the upper or lower sections 72, 78.

As also shown in FIG. 5, the passenger support 60 in the illustrated embodiment includes a trim carrier 80 having an open matrix that defines a pattern of resilient elements that are configured to support the weight of an occupant. The trim carrier 80 has an upper panel and a lower panel that detachably couple with the respective upper section 72 and the lower section 78 of the suspension assembly 68. The passenger support 60 also includes a cushion 82 that is disposed over a forward facing surface of the trim carrier 80. The cushion 82 includes a resilient structure of woven fibers that has open areas for ventilation; however, the cushion 82 may also include open cell foam, closed cell foam, or other conceivable flexible and breathable materials. Further, the passenger support 60 includes a cover stock 84 to define the back support surface of the passenger support 60 and to assist in retaining the cushion 82 against the trim carrier 80. The cover stock 84 may conceivably include a fabric material, a leather material, a vinyl material, or other upholstery materials generally known in the art.

Figure 6:
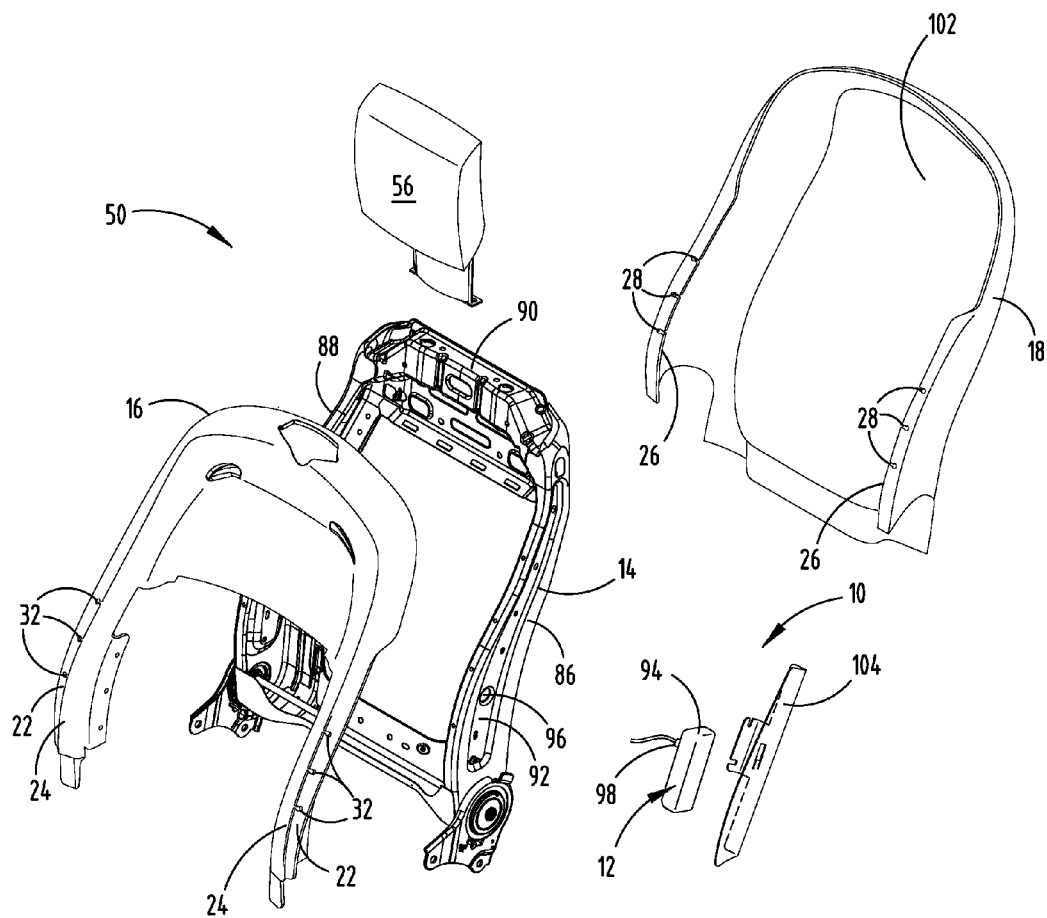
FIG. 6 is an exploded top perspective view of the support structure of the seatback.
Figure 12:
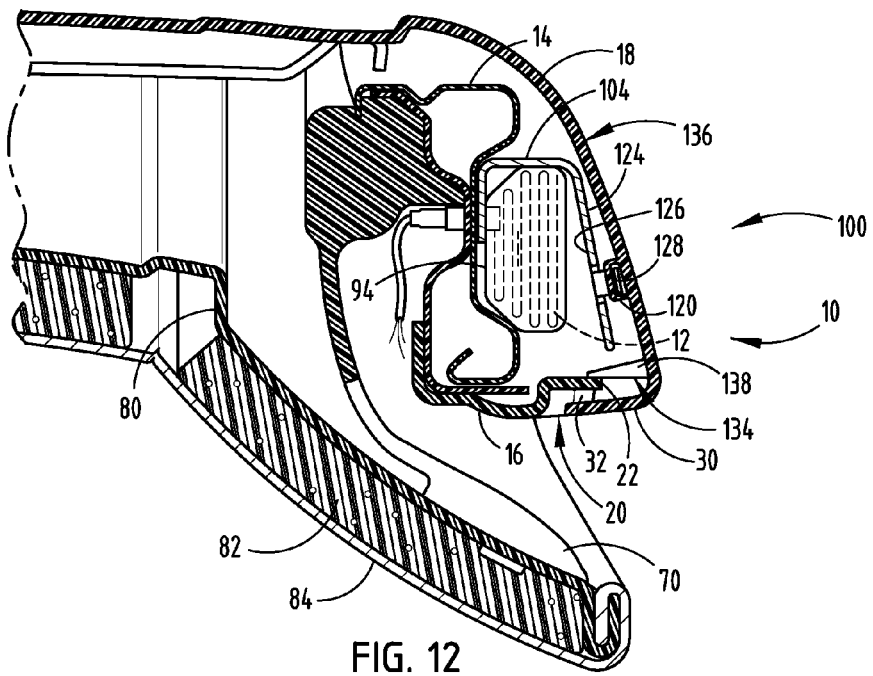
FIG. 12 is a cross-sectional view of the seatback having the airbag assembly in a contained position, taken at line XII-XII of FIG. 4.

Referring now to FIG. 6, the internal seat frame 14 of the support structure 50 in the illustrated embodiment includes a first frame member 86 and a second frame member 88 extending upward from the pivotal connection with the recliner brackets that attach to the seat bottom 38 (FIG. 2). The first and second frame members 86, 88 are substantially parallel with each other and curve upward and rearward from the recliner brackets to provide a curved shape that is substantially similar to an occupant's spinal column. Further, the frame members are more robust proximate the recliner brackets and taper as they extend upward to couple with a top frame member 90 that extends orthogonally between the first and second frame members 86, 88 to support the head restraint 56. Accordingly, the first and second side members 52, 54 of the overall support structure 50 include the first and second frame members 86, 88, respectively, and the top member 58 includes the top frame member 90. The first frame member 86 includes an elongated cavity 92 on an exterior side of the first frame member 86, such that the first frame member 86 corresponds with the outboard side of the seat assembly 34 in the driver's side location of the illustrated embodiment. The elongated cavity 92 is shaped to receive a base portion 94 of the side airbag assembly 10. A retention aperture 96 is formed in the elongated cavity 92 for receiving a lateral protrusion 98 on the base portion 94 that houses an electrical wire that extends from the side airbag assembly 10 to electrically couple with the vehicle controller 46. More specifically, an intermediate region of the longitudinal extent of the first frame member 86 includes a portion of the elongated cavity 92 that is shaped to retain the airbag 12 in a contained position 100 (FIG. 12).

As also illustrated in FIG. 6, the first and second trim pieces 16, 18 that engage to substantially enclose the internal seat frame 14 are shown exploded away from the internal seat frame 14. The first and second trim pieces 16, 18 detachably engage along a seam 20 (FIG. 8) to conceal the airbag 12 and to define an exterior surface of the support structure 50. The first trim piece 16 includes a U-shape and substantially encloses a front portion of the internal seat frame 14 and it is contemplated that the first trim piece 16 may extend laterally inward to couple with the suspension assembly 68. The second trim piece 18 wraps over the exterior sides of the first and second frame members 86, 88 to partially conceal the elongated cavity 92 and includes a rear panel portion 102 that spans between the first and second frame members 86, 88 and to substantially enclose a rear portion of the seat frame 14. As also shown, an interior surface of the second trim piece 18 couples with a sleeve member 104 of the side airbag assembly 10, as described in more detail below. It is contemplated that the internal seat frame 14 is constructed of a metal material and that the first and second trim pieces 16, 18 are molded of a polymer material. However, it is also conceivable that the frame 14 may be constructed of other similar substantially rigid materials and the trim pieces 16, 18 may be made of other flexible materials relative to the internal frame 14.

Figure 7:
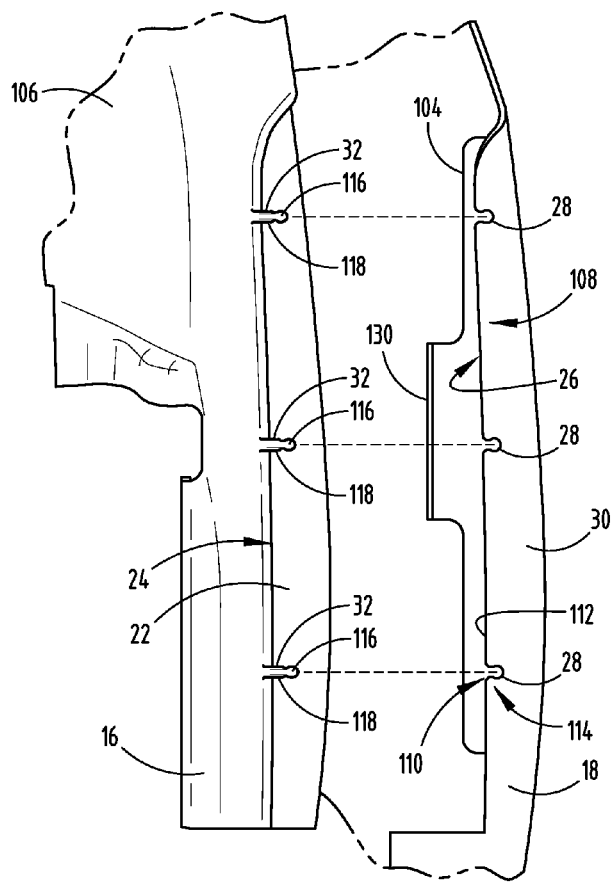
FIG. 7 is a front elevational view of a section of a first trim piece of the support structure exploded from a section of a second trim piece of the support structure.
Figure 8:
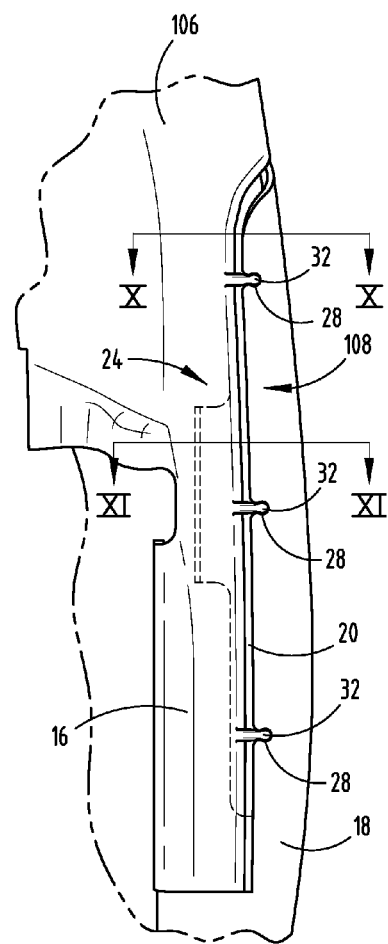
FIG. 8 is a front elevational view of the section of the first trim piece engaged with the section of the second trim piece.

As illustrated in FIGS. 7-8, portions of the first and second trim pieces 16, 18 engage along the seam 20 over the exterior side member of the seat frame 14. More specifically, the first trim piece 16 has a flange 22 that protrudes from an edge 24 of a body portion 106 of the first trim piece 16. The flange 22 protrudes in planar alignment with the body portion 106 of the first trim piece 16 and is inset inward from an exterior surface of the first trim piece 16. The flange 22 is formed to align with a cavity 26 that similarly extends along an edge 108 of the second trim piece 18. As shown in FIG. 8, the cavity 26 matably engages with the flange 22 along the seam 20, placing the edge 24 of the first trim piece 16 in close proximity to the edge 108 of the second trim piece 18. It is understood that the edges 24, 108 may be configured to be in abutting contact upon engagement of the first and second trim pieces 16, 18.

As also shown in the embodiment illustrated in FIGS. 7-8, a series of retention slots 28, specifically three retention slots 28, are disposed on the exterior wall 30 of the cavity 26. The retention slots 28 includes an upper portion 110 proximate a top surface 112 of the exterior wall 30 and a circular lower portion 114 having a larger width than the upper portion, defining a keyhole shape. A corresponding attachment element 32 for each retention slot 28 is formed to protrude laterally and adjacent to the flange 22. Accordingly, in the illustrated embodiment, three attachment elements 32 protrude laterally in generally parallel alignment with each other. The attachment elements 32 each include a rounded bulbous end 116 having a greater width than a neck portion 118 of the attachment element 32 that extends between the edge 24 of the first trim piece 16 and the bulbous end 116. The bulbous end 116 is configured to engage the lower portion 114 of the retention slot 28, such that the bulbous end 116 must overcome the upper portion 110 of the retention slot 28 for the first trim piece 16 to disengage from the second trim piece 18 upon deployment of the airbag 12, as discussed in more detail below. It is conceivable that additional embodiments may include more or fewer retention slots 28 and corresponding attachment elements 32. It is also understood that some or all of the retention slots 28 and the attachment elements 32 may be reversed, such that the front trim piece 16 may include a retention slot 28 and the rear trim piece 18 may include an attachment element 32.

Figure 9:
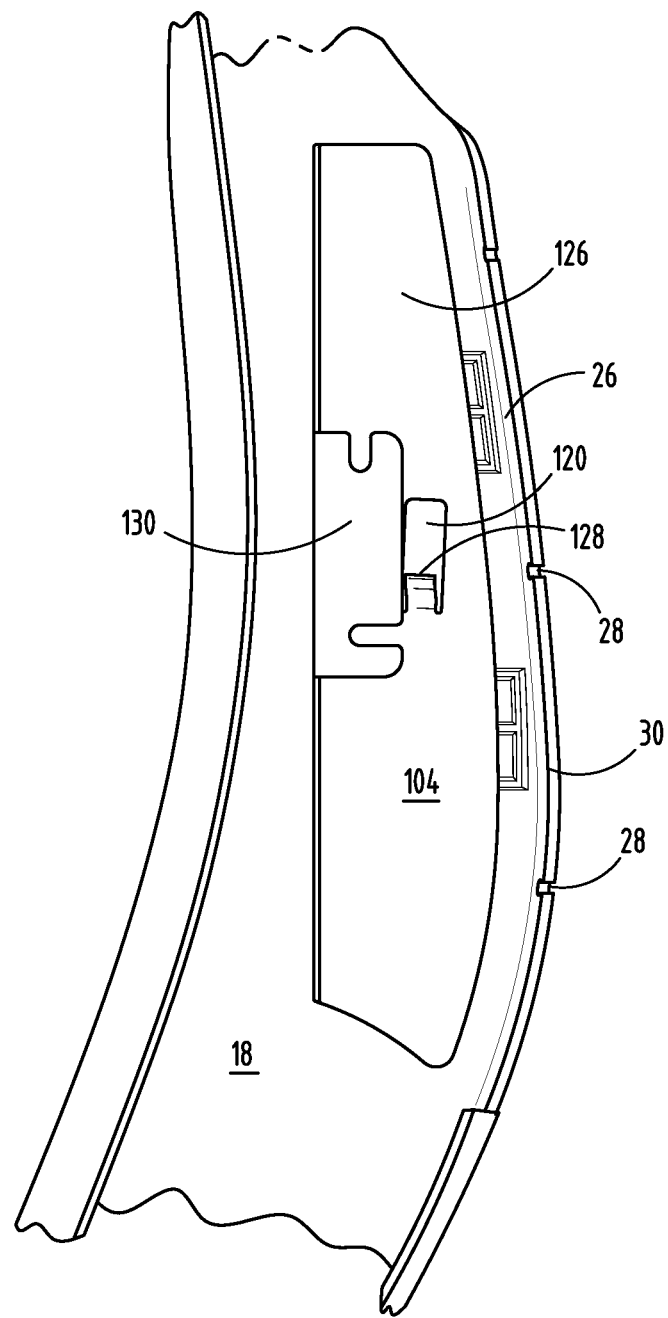
FIG. 9 is a side elevational view of an interior portion of the section of the second trim piece.
Figure 10:
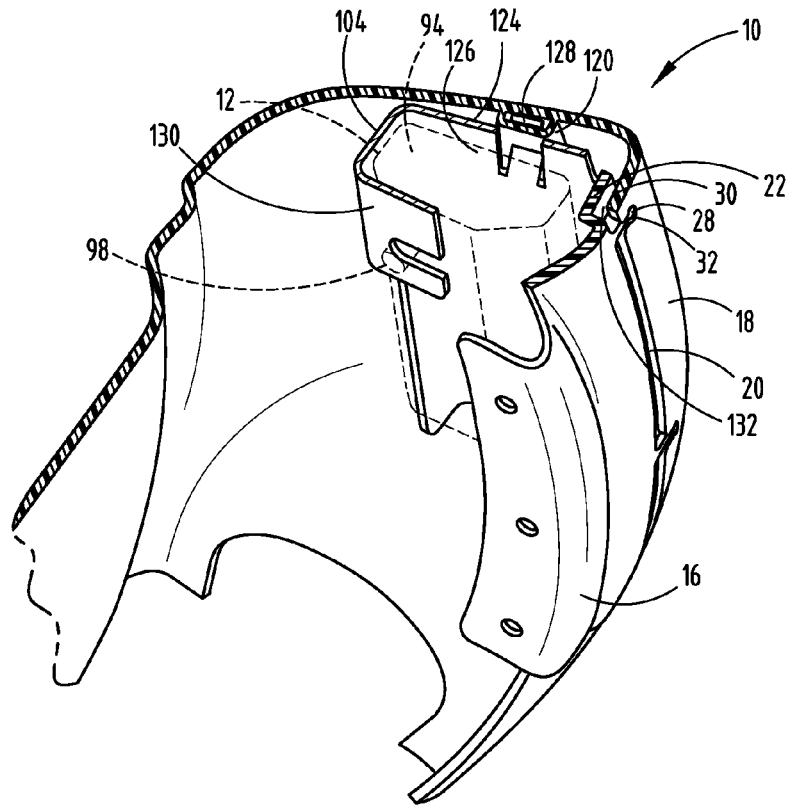
FIG. 10 is a top perspective cross-sectional view of the first trim piece engaged with the second trim piece, taken at line X-X of FIG. 8.
Figure 10A:
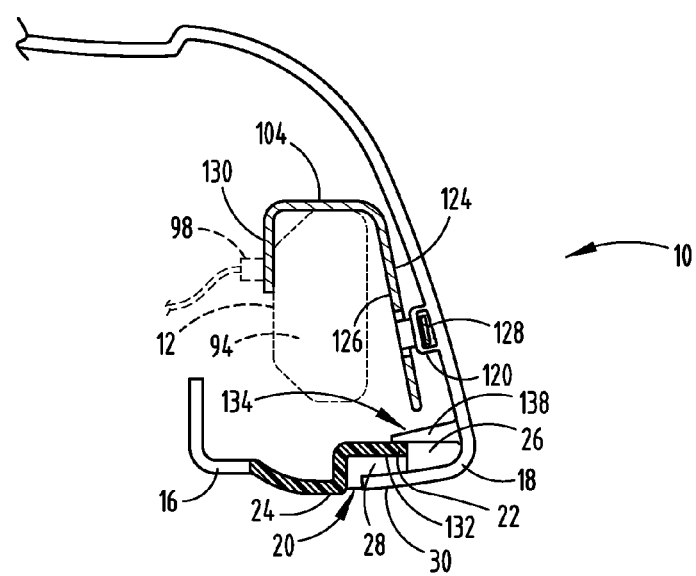
FIG. 10A is a top plan cross-sectional view of the first trim piece engaged with the second trim piece, taken at line X-X of FIG. 8.

Referring now to FIGS. 9-10A, the inside surface of the second trim piece 18 is shown having the sleeve member 104 attached to a loop feature 120 that protrudes inward from the inside surface. The sleeve member 104 couples between the second trim piece 18 and the airbag 12 for supporting and directing the airbag 12 though the seam 20 upon deployment. More specifically, the sleeve member 104 includes a planar member 124 adjacent to the inside surface of the second trim piece 18 that has a substantially planar surface 126 that is configured to contact and direct the airbag 12 through the seam 20, as explained in more detail below. The planar member 124 includes a tab 128 protruding outward to engage the loop feature 120 on the interior surface of the second trim piece 18. The sleeve member 104 also includes an L-shaped engagement member 130 that extends inward from the planar member 124 and forward to engage opposing sides of the lateral protrusion 98 on the base portion 94 of the side airbag assembly 10 that houses an electrical wire that couples with the vehicle controller 46. Accordingly, the sleeve member 104 has a generally C-shaped cross section, as shown in FIG. 10A, for containing the side airbag assembly 10 and directing the airbag 12 forward through the seam 20.

As also shown in FIGS. 10-10A, the flange 22 includes an exterior surface 132 that has the attachment element 32 integrally protruding forward from the exterior surface 132. It is contemplated that the attachment element 32 may be spaced away from the exterior surface 132 in additional embodiments. It is also understood that the attachment element 32 may be alternatively shaped to include a triangular shaped bulbous end 116 (FIG. 7), an angled or curved neck portion 118 (FIG. 7), or other conceivable shapes to restrict the attachment element 32 from disengaging from the retention slot 28 until the airbag 12 is deployed.

Figure 11:
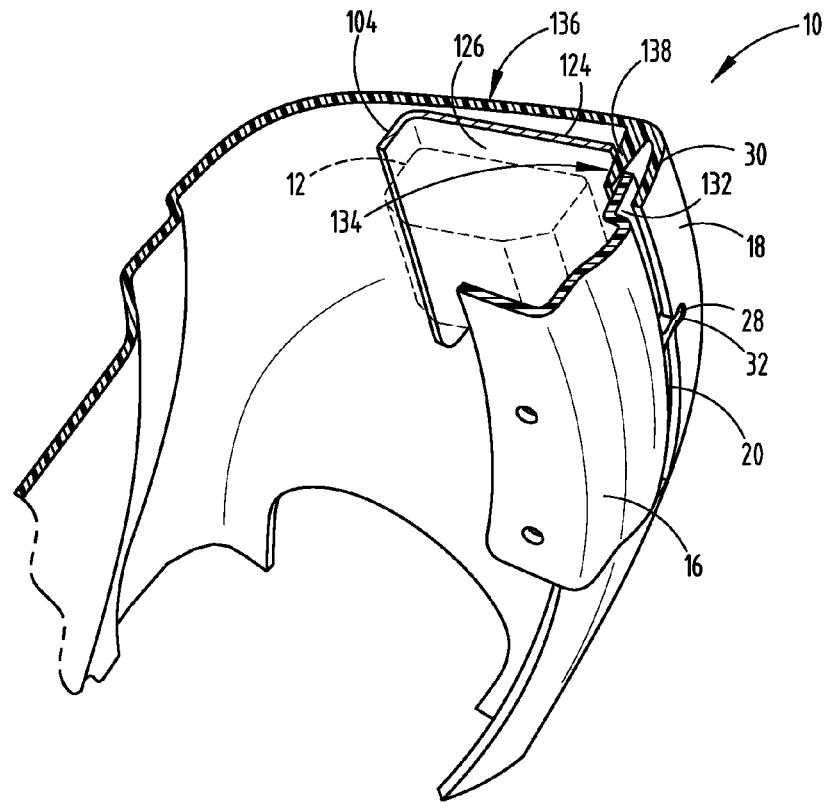
FIG. 11 is a top perspective cross-sectional view of the first trim piece engaged with the second trim piece, taken at line XI-XI of FIG. 8.
Figure 11A:
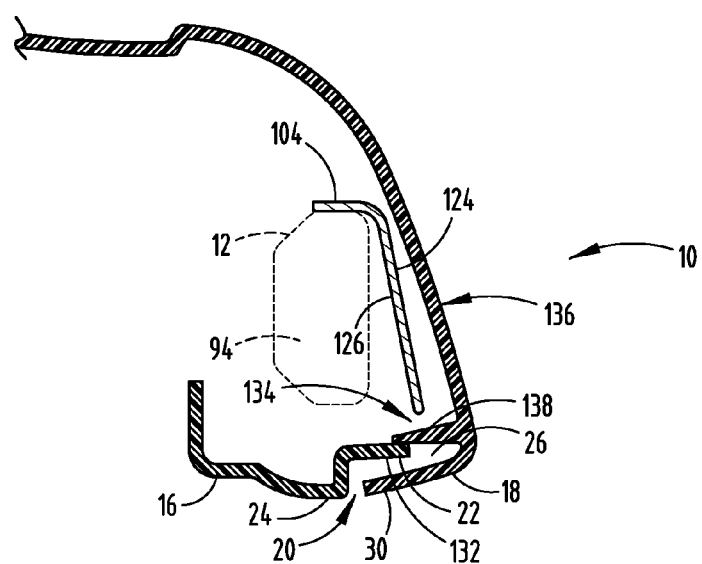
FIG. 11A is a top plan cross-sectional view of the first trim piece engaged with the second trim piece, taken at line XI-XI of FIG. 8.

As illustrated in FIGS. 11-11A, the second trim piece 18 includes a lateral section 134 having the cavity 26 and a longitudinal section 136 that extends rearward adjacent to the planar member 124 of the sleeve member 104. More specifically, the cavity 26 extends along the edge of the lateral section 134 to align the seam 20 for the airbag 12 to deploy forward. The cavity 26 is defined by and extends between an interior wall 138 and the exterior wall 30 that extend along the edge 108 of the second trim piece 18. The flange 22 engages between the interior and exterior walls 138, 30 of the cavity 26 and, in the illustrated embodiment, abuts the interior wall 138, although it is understood that the flange 22 may abut both walls or only the exterior wall 30 at other cross sections from that illustrated in FIG. 11A. The retention slots 28 extend laterally from the top surface 112 of the exterior wall 30 toward the bottom of the cavity 26. It is also understood that the retention slot 28 in additional embodiments may be alternatively shaped to conform to an alternatively shaped attachment element 32.

Referring now to FIG. 12, the airbag 12 is shown in the contained position 100, where the airbag 12 is contained within the base portion 94 of the airbag assembly and substantially concealed by the trim pieces 16, 18. In this contained position 100, the front and rear trim members 16, 18 engage along the seam 20 disposed on a forward facing portion of the exterior side member of the vehicle seat to conceal the airbag 12 and to provide a direction for accurately deploying the airbag 12 forward through the seam 20. The longitudinal section 136 of the second trim piece 18 curves rearward and inward to extend laterally and span across to conceal the rear area of the seatback 40. The first trim piece 16 extends laterally inward to engage the first frame member 86, whereby the flexible members 70 of the suspension assembly 68 extend forward to define the external peripheral gap 66 between the support structure 50 and the passenger support 60. It is contemplated that the specific shape and orientation of the first trim piece 16 and the second trim piece 18, especially with regard to components of the seatback 40 inboard the airbag assembly, may be alternatively shaped and constructed.

Figure 12A:
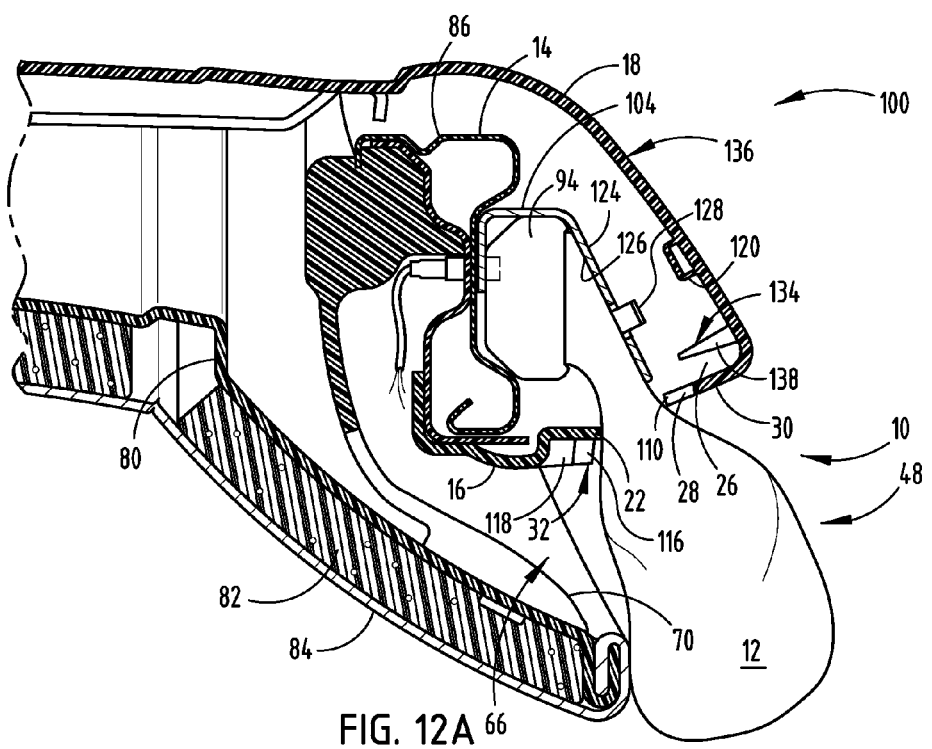
FIG. 12A is a cross-sectional view of the seatback having the airbag assembly in a deployed position, taken at line XII-XII of FIG. 4.

As illustrated in FIG. 12A, the airbag 12 is deployed forward through the seam 20, disengaging the first and second trim pieces 16, 18. More specifically, the airbag 12 stowed within the base portion 94 of the airbag assembly deploys from the contained position 100 (FIG. 12) to the deployed position 48, as shown. In the deployed position 48, the airbag 12 inflates and extends from the base portion 94 laterally outward against the planar surface 126 of the planar member 124, directing the airbag 12 forward through the seam 20 and beyond the passenger support 60, as shown in FIGS. 3-4. In the deployed position 48, the airbag 12 provides a cushioned protective support between a seated passenger and an outboard interior surface of the vehicle 36, such as the side door (FIG. 1). Upon inflation of the airbag 12, the airbag 12 deforms the sleeve member 104 laterally outward and disengages it from the second trim piece 18. More specifically, the tab 128 on the sleeve member 104 disengages from the loop feature 120 on the second trim piece 18, causing the second trim piece to move laterally away from the planar member 124 of the sleeve member 104. The sleeve member 104 thereby maintains it position relative to the first frame member 86 to continue to accurately direct the airbag 12 through the seam 20. Also, the airbag 12 deforms the second trim piece 18 laterally outward to forcibly cause the bulbous end 116 of the attachment element 32 to deform and overcome the upper portion 110 of the retention slot 28 disengaging the flange 22 from the cavity 26, such that the seam 20 widens abruptly to accurately direct the airbag 12 forward beyond the passenger support 60 with minimal resistance from the passenger support 60.

The deployed position 48, as shown in FIG. 12A, is merely one depiction of an incremental stage as the airbag 12, upon deployment, inflates at a rapid rate pushing the airbag 12 out from the base portion 94 of the airbag assembly in the outward and forward direction beyond the illustrated position. It is contemplated that the airbag 12 may inflate with gases generated from a pyrotechnic reaction, a compressed air release, and/or another chemical reaction or other conceivable inflation methods. It is also conceivable that after deployment of the airbag module, the airbag 12 may be constrained by internal tethers to prevent the airbag 12 from inflating beyond a desired location, and the airbag assembly may be replaced and the seatback assembly may be restored with minimal necessary repair to the passenger support 60 and the suspension system.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A side airbag assembly comprising:
   an airbag coupled with a vehicle seat frame;
   first and second trim pieces engaged along a seam to conceal the airbag;
   a flange protruding along an edge of the first trim piece;
   a cavity extending along the second trim piece and matably engaging the flange;
   a retention slot disposed on a wall of the cavity; and
   an attachment element protruding adjacent to the flange and frictionally engaging the retention slot, wherein the attachment element is configured to disengage from the retention slot upon deployment of the airbag forward through the seam.

2. The side airbag assembly of claim 1, further comprising:
   a sleeve member coupled between the second trim piece and the airbag, wherein the sleeve member includes a planar surface configured to direct the airbag through the seam upon deployment.

3. The side airbag assembly of claim 2, wherein the sleeve member disengages from the second trim piece upon deployment of the airbag through the seam.

4. The side airbag assembly of claim 1, wherein the retention slot includes an upper portion proximate a top surface of the wall and a lower portion having a larger width than the upper portion, defining a keyhole shape.

5. The side airbag assembly of claim 4, wherein the attachment element includes a bulbous end engaging the lower portion of the retention slot that overcomes the upper portion to disengage from the retention slot upon deployment of the airbag through the seam.

6. The side airbag assembly of claim 5, wherein an edge portion of the second trim piece includes an interior wall and an exterior wall that border opposing sides of the cavity, and wherein the retention slot is disposed on the exterior wall.

7. The side airbag assembly of claim 6, wherein the flange includes an exterior surface that engages the exterior wall, wherein the attachment element extends from the edge of the first trim piece and integrally protrudes from the exterior surface of the flange.

8. A side airbag assembly comprising:
   an airbag coupled with a seat frame;
   first and second trim pieces engaging along a seam over the airbag;
   a flange along an edge of the first trim piece;
   a cavity along the second trim piece engaging the flange;
   a slot on a wall of the cavity; and
   an attachment element on the flange that engages the slot for disengaging upon deployment of the airbag through the seam.

9. The side airbag assembly of claim 8, further comprising:
   a sleeve member coupled between the second trim piece and the airbag, wherein the sleeve member includes a planar member configured to direct the airbag through the seam upon deployment.

10. The side airbag assembly of claim 9, wherein the planar member includes a tab protruding outward to engage a loop feature on an interior surface of the second trim piece.

11. The side airbag assembly of claim 8, wherein the slot includes an upper portion proximate a top surface of the wall and a lower portion having a larger width than the upper portion, and wherein the attachment element includes a bulbous end that engages the lower portion of the slot and is configured to disengage upon deployment of the airbag.

12. The side airbag assembly of claim 8, wherein the second trim piece includes a lateral section and a longitudinal section that extends rearward, and wherein the cavity extends along an edge portion of the lateral section and engages the flange to define the seam.

13. The side airbag assembly of claim 8, wherein an edge portion of the second trim piece includes an interior wall and an exterior wall that border opposing sides of the cavity, and wherein the slot is disposed on the exterior wall.

14. The side airbag assembly of claim 13, wherein the flange includes an exterior surface having the attachment element integrally raised away from the exterior surface.

15. The side airbag assembly of claim 14, wherein the first and second trim pieces engage along an outboard side member of the seat frame, and wherein the second trim piece includes a rear panel that spans between the outboard side member and an inboard side member.

16. A side airbag assembly for a vehicle seat, comprising:
   an airbag;
   a front trim member having a flange extending laterally;
   a rear trim member having a cavity along an edge thereof;
   a slot disposed on a wall of the cavity; and
   an attachment element protruding from the flange and engaging the retention slot for disengaging upon a deployment of the airbag, wherein the flange engages the cavity to define a breakaway seam for the deployment.

17. The side airbag assembly of claim 16, wherein the slot includes an upper portion proximate a top surface of the wall and a lower portion having a larger width than the upper portion, and wherein the attachment element includes a bulbous end that engages the lower portion of the slot and is configured to overcome the upper portion upon the deployment.

18. The side airbag assembly of claim 16, wherein the rear trim member includes a lateral section and a longitudinal section, and wherein the cavity extends along an edge portion of the lateral section to align the breakaway seam for the airbag to deploy forward.

19. The side airbag assembly of claim 16, wherein an edge portion of the rear trim member includes an interior wall and an exterior wall that extend laterally and border opposing sides of the cavity.

20. The side airbag assembly of claim 19, wherein the slot is disposed on the exterior wall and the attachment element extends laterally from an edge of the front trim member adjacent to the flange, and wherein the front and rear trim members engage along an exterior side member of the vehicle seat to conceal the airbag.

* * * * *